United States Patent [19]

Maxwell

[11] 3,891,973

[45] June 24, 1975

[54] MULTI-FUNCTION DIGITAL COUNTER/TIMER

[75] Inventor: Jerome Eugene Maxwell, Colorado Springs, Colo.

[73] Assignee: TRW Inc., Redondo Beach, Calif.

[22] Filed: Aug. 16, 1973

[21] Appl. No.: 389,047

[52] U.S. Cl........... 340/172.5; 235/92 T; 235/92 SH

[51] Int. Cl........... G06f 7/38

[58] Field of Search..... 340/172.5; 235/92 T, 92 SH

[56] References Cited

UNITED STATES PATENTS

| | | | |
|---|---|---|---|
| 3,566,097 | 2/1971 | Hildebrandt | 235/92 SH |
| 3,571,808 | 2/1971 | Washizuka et al. | 340/172.5 |
| 3,609,696 | 9/1971 | Doting | 340/172.5 |
| 3,656,122 | 4/1972 | Pasternack | 235/92 TX |

*Primary Examiner*—Gareth D. Shaw
*Assistant Examiner*—John P. Vandenburg
*Attorney, Agent, or Firm*—Daniel T. Anderson; Stephen J. Koundakjian; Edwin A. Oser

[57] ABSTRACT

A plurality of numerical words to be incremented or decremented is serially stored in a cyclic binary shift register comprising an accumulator section and a memory section. All digits in the series are repeatedly circulated through the accumulator section upon which logic means operates to cause each digit value instantaneously contained therein to be selectively left unchanged or changed unitarily in a particular arithmetic modulus, depending on the identity of the digit. A counter monitors the circulation of digits and identifies the instantaneous content of the accumulator to permit the logic means to select the proper operation and modulus. Input and output means are provided, and an external clock may be employed to determine when each digit value should be changed, inserted, or extracted.

15 Claims, 4 Drawing Figures

MULTI-FUNCTION DIGITAL COUNTER/TIMER

BACKGROUND OF THE INVENTION

1. Field of Invention

This invention relates to the field of electronic digital counter/timers.

2. Description of Prior Art

Typically an electronic digital counter/timer utilizes a high-frequency crystal clock as the initial timing source. A frequency divider (made up of a series of cascaded counters) reduces the frequency of oscillation of the crystal clock so that usable counts in seconds, minutes, hours, etc. may be obtained.

While such timers are reasonably inexpensive and reliable, where a single count is desired, difficulties arise if a number of independent counts are desired. The basic problem is that in a plurality of multi-modular counts, a complex frequency division cascade logic means must be utilized for each count, precluding the possibility of any substantial amount of circuitry sharing. The only elements of such system that could be conveniently time-shared would be the basic clock, decoding, input/output and display functions.

Accordingly, a device adapted to simultaneously count a plurality of independent, multi-modular time words according to the design heretofore utilized in such devices, would require a large number of circuitry components. This, in turn, would result in high cost and limited reliability of such a complex device. Also, since the number of components comprising a circuit is in a definite relationship to the size of any device incorporating the circuit, such a state-of-the-art, multi-function counter/timer would be difficult, if not impossible, to miniaturize, for example, by placement of the entire logic on a single MOS/LSI (metallic oxide semiconductor/large scale integrated) chip.

SUMMARY OF INVENTION

Accordingly, it is an object of the present invention to provide an improved electronic digital counter/timer having the capability of performing a plurality of independent timing/counting operations with a minimal number of electronic circuit components.

The independent numerical words which are to be selectively periodically incremented or decremented are stored serially in a stack-oriented electronic storage device, e.g., a cyclic binary shift register. The storage device comprises two portions — a relatively large data memory section and a smaller data accumulator section. A numerical word series is logically represented within the storage device as an ordered series of individual digits which is cyclic in nature, i.e., every digit in the series is logically positioned between two other digits.

The accumulator contains enough bit positions to store at least one (only one in the preferred embodiment) digit. Shifting means are provided to continually serially circulate the digits of the word series through the data memory, from the data memory to the data accumulator, through the data accumulator and back to the data memory.

While in the data accumulator, each digit is acted upon by electronic logic means which leaves its value unchanged or performs a unitary increment or decrement in its value in a selected arithmetic modulus. The operation and modulus depend on which digit of which numerical word is instantaneously in the data accumulator.

Input means are provided to set the value of any digits of any numerical word in the storage means. Likewise, output means permitting extraction of the instantaneous value of all digits in a selected word (ordinarily as input for a display device) are provided.

DETAILED DESCRIPTION OF PREFERRED EMBODIMENT

The preferred embodiment of the present invention comprises an electronic digital multi-function counter. The device is adapted to virtually simultaneously process a number of independent time counts. Examples of such time counts would be the time-of-day, expressed in a 12 or 24 hour cycle (hours, minutes, second and hundredths of seconds); elapsed time, expressed in hours, minutes, seconds and hundredths of seconds or merely decimally in seconds; countdowns expressed in various decimal or multi-modular (e.g. hours, minutes, etc.) formats; etc. It is a significant feature of the present invention that a plurality of such counts, whether incremental or decremental, can be performed with this device utilizing a single memory and with time-sharing of most other logical circuitry.

Figure 1:
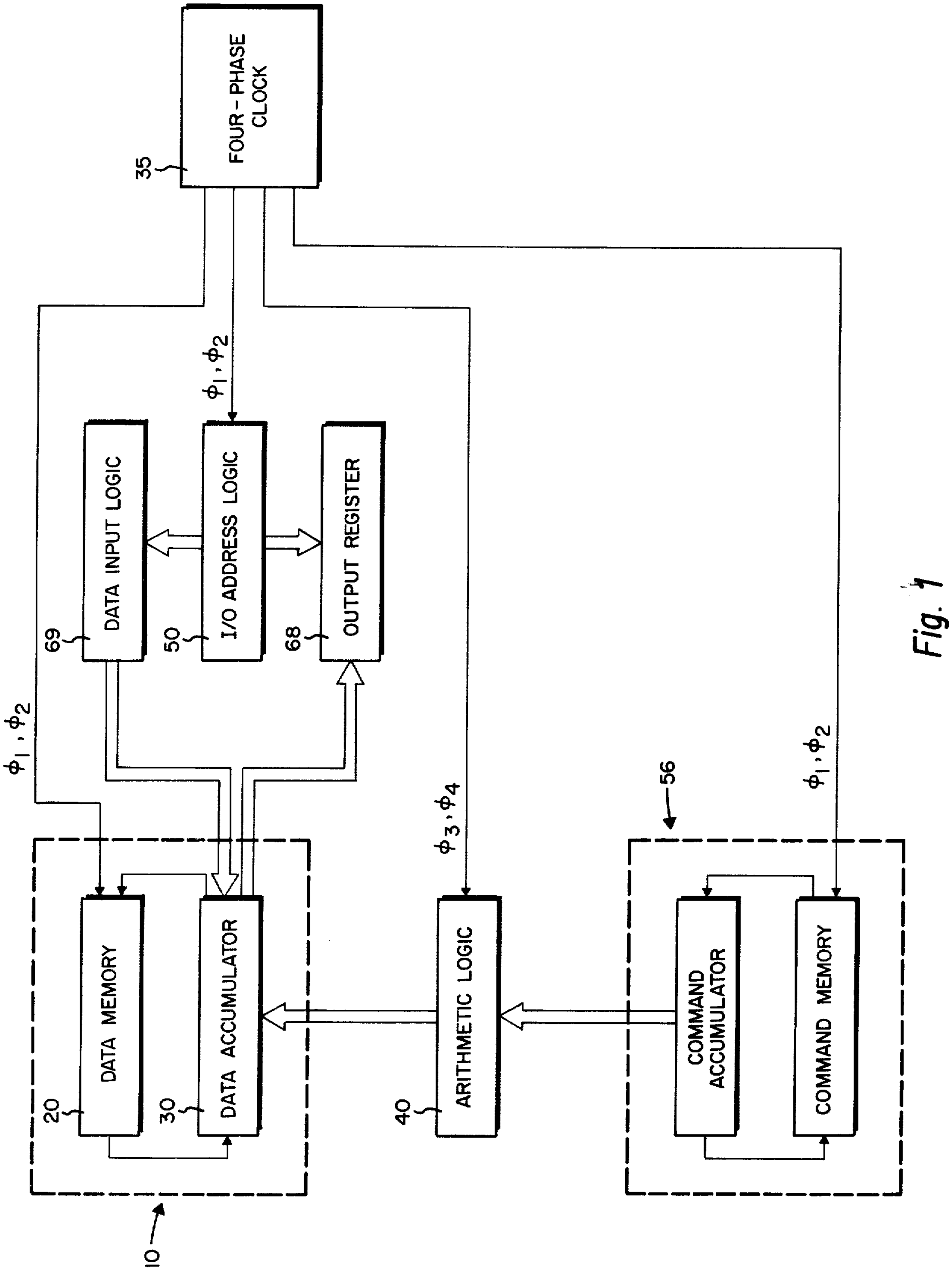
FIG. 1 is a block logic diagram of the preferred embodiment of the present invention.

As shown in FIG. 1, the basic electronic storage means in which the "time words" are stored, comprises a dynamic binary shift register 10, comprising a data memory 20 and a data accumulator 30. A time word is here defined as one of the multi-digit (and perhaps also multi-modular) time expressions which is to be incremented or decremented by the apparatus. In the preferred embodiment of the present invention, eight time words, each having eight digits, are processed in the device. Binary coded decimal (BCD) format is used, since most commercially available display devices require a BCD input. Thus, in the preferred embodiment of the present invention, the storage means comprises a 256-bit shift register — four bits per digit, eight digits per time word, and eight time words.

In effect, both the data memory 20 and the data accumulator 30 constitute a single shift register. The shift register is "cyclic", i.e., the left-most bit position in the data memory, as shown in FIG. 1, logically immediately follows the left-most bit position in the data accumulator, and the right-most bit in the data accumulator logically follows the right-most bit position in the data memory. During operation of the apparatus, a shifting means, more thoroughly described below, causes each of the bits in the data storage means 10 to circulate serially and cyclically through the entire shift register.

The data accumulator 30, for reasons more fully described below, must contain at least as many bit position as will constitute a single digit. In the BCD format of the preferred embodiment of the present invention, this means that the data accumulator must be a four-bit accumulator, and it is preferrable that it contain four bit positions only. Of course, it will be readily understood that, at any given time, the four bit values in the data accumulator may comprise parts of two separate digits, perhaps even part of the last digit of one time word and the first digit of the next time word. However, the I/O (input/output) address logic means 50, more fully described below, insures that the identity of the instantaneous content of the data accumulator 30 is always known and that, accordingly, the arithmetic logic 40 is properly activated.

The shift register (both the data memory 20 and data accumulator 30) comprises a series of master-slave synchronous RS (set-reset) flip-flops. Circulation of bit values through the shift register is accomplished by means of clock pulses eminating from a four-phase clock 35 oscillating at approximately 200 kHz. Phase I and phase II of each cycle shift the register (i.e., shift each bit value one position in a counterclockwise direction, as shown in FIG. 1), while phases III and IV activate the arithmetic logic to perform appropriate arithmetic manipulation of the data accumulator content.

In the preferred embodiment of the present invention, utilizing BCD formatting, the data accumulator 30 contains four bit positions, i.e., enough to accomodate a single digit. Without departing from the spirit of the present invention, those skilled in the art to which it pertains, may readily adapt this device to operate in other formats, for example, binary, in which case the accumulator could be adapted to contain a single or any other number of bits. Likewise, the device might be adapted to operate in BCD format with the accumulator adapted to contain a plurality of digits simultaneously. However, it has been found most convenient to operate on a single digit during each arithmetic manipulation — hence, a four-bit data accumulator is utilized.

Figure 2:
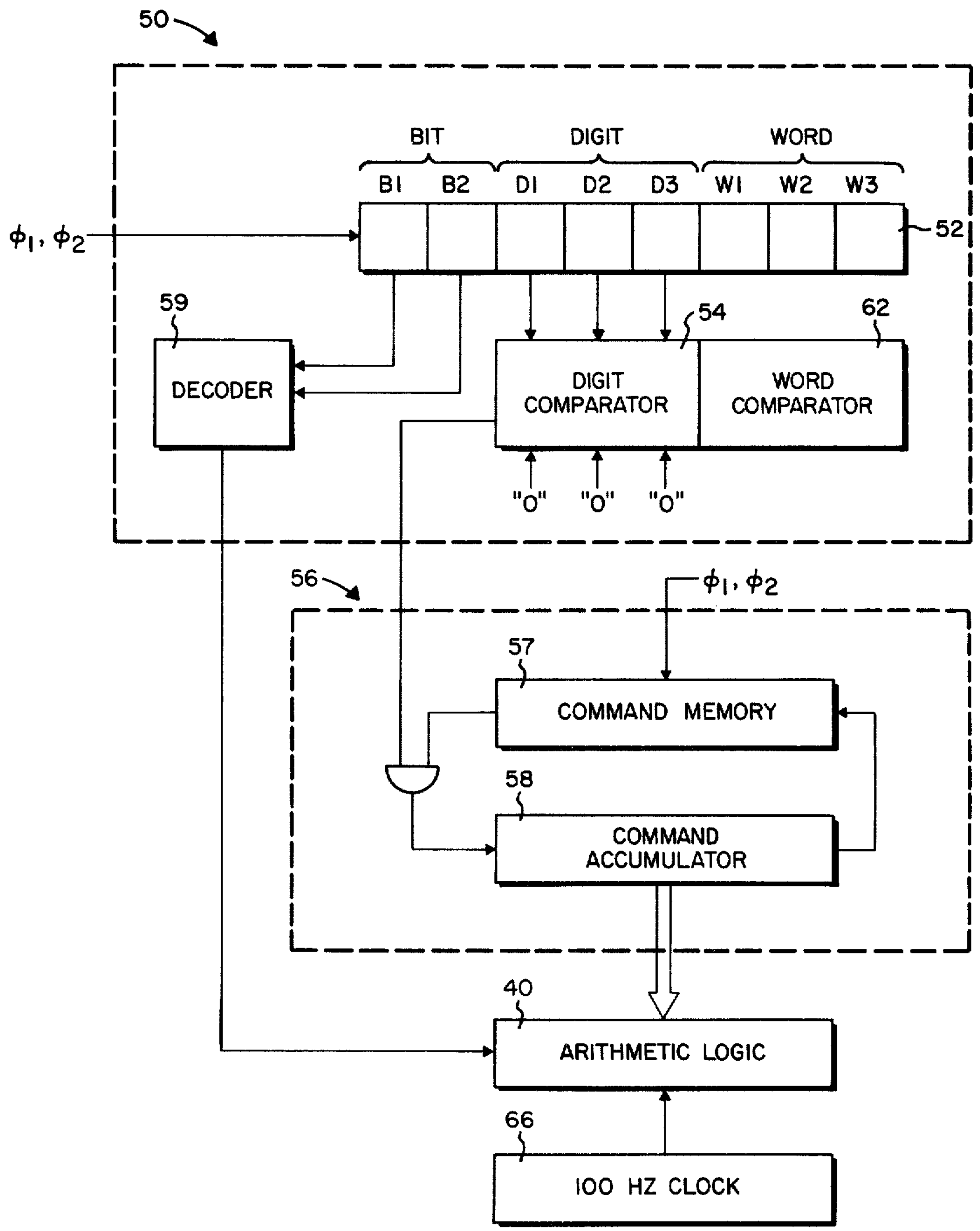
FIG. 2 is a block logic diagram of details of the I/O address logic means, the command register and related circuitry as shown generally in FIG. 1.

The I/O address logic means 50 is utilized in monitoring the instantaneous content of the data accumulator 30. As shown in FIG. 2, the "heart" of the timing device is an eight-position binary ripple counter 52. The binary ripple counter comprises eight trailing-edge, master-slave, toggle flip-flops in series. As shown in FIG. 2, there are two bit designator positions (B1 and B2) three digit designator positions (D1, D2 and D3) and three word designator positions (W1, W2 and W3). The significance of each of the three sections of the ripple counter is as follows:

Since BCD formatting is utilized, four bits are required to express each digit. Thus, each bit of each digit occupies one of four positions within that digit. Since there is no "zero" bit position, binary 00 is arbitrarily defined as bit position 1, 01 as bit position 2, 10 as position 3, and 11 as position 4. Thus, the left-most two positions of the ripple counter 52, i.e., the bit designators, identify the left-most bit within the data accumulator 30 in terms of the position of that bit within the digit to which it belongs. Thus, when positions B1 and B2 of the ripple counter indicate binary 11 (=4), the data accumulator is "full" — a complete digit is contained therein.

In the preferred embodiment of the present invention, each time word consists of eight digits. Since decimal "8" can be expressed as a three-bit binary number, (again defining binary 00 as 1), the position of the digit (within its time word), of which the bit just entering the data accumulator is a part, is identified.

In similar manner, the word designator positions, W1, W2, and W3 of the binary ripple counter 52, identify the position (within the word series) of the time word of which that bit is a part.

The binary ripple counter 52 is activated by the same phase I, phase II clock pulses as are utilized in activating the shift register 10. Accordingly, each shift in the shift register is accompanied by a corresponding shift in the ripple counter, and an entire cycle of the shift register corresponds to an entire cycle of the ripple counter.

In the preferred embodiment of the present invention, the command register 56, like the storage means 10, comprises a binary shift register having two portions — a command memory 57 and a command accumulator 58. The information contained within the command register comprises a single logic code for each of the eight time words and is contained serially and cyclically within the command register and in the same fashion as the time word information is contained within the storage means. Each logic code consists of a four-bit instruction to the arithmetic logic 40. The instruction merely actuates a particular logic circuitry within the arithmetic logic adapted to operate, in consecutive order, on the eight digits of the particular time word to which the code corresponds.

Accordingly, the command register 56 contains, in the preferred embodiment of the present invention, 32 bit positions — four for each of the eight time words. At any given time, 28 are contained in the command memory 57 and the other four are contained in the command accumulator 58. The command register circulates according to the same phase I, phase II clock pulses as actuate the storage means 10. A particular logic code is shifted into the command accumulator at the same time as the first four bits of the time word to which it corresponds are shifted into the data accumulator 30 from the data memory 20. This is accomplished by gating the output of the digit comparator 54 with the command register. The digit comparator is adapted to compare the binary number 000 with the contents of the digit designator bit positions D1, D2, D3, which will read 000 each time the first digit of a new time word is being shifted into the data accumulator 30. Thus, the logic code for the new time word is shifted into the command accumulator 58 simultaneously with the shifting of the first digit of the corresponding time word into the data accumulator 30. This logic code will remain in the command accumulator 58 until the first digit of the next time word begins to be shifted into the data accumulator 30.

It will be readily noted by those skilled in the art to which this invention pertains, that each of the logic codes could be exressed as a three-bit binary number rather than a four-bit number, since by arbitrarily defining the 000 as 1, all numbers from 1 to 8 can be expressed in three binary bits. However, the redundant bit in each logic code is added to simplify the logic means necessary to simultaneously shift (a) a new logic code into command accumulator 58 and (b) the first four-bit digit of a new time word into the data accumulator 30; and to simplify command decoding.

The arithmetic logic 40 contains logic circuitry (whose design is well within the capability of those skilled in the art to which this invention pertains) adapted to unitarily increment, unitarily decrement or ignore each digit in the data accumulator 30. The arithmetic logic circuitry performs modular arithmetic, by means of combinational logic, on each such digit.

It should be noted that within a given time word, as many as three moduli may be present within its digits. For example, if a 24 hour count is being made, the modulus associated with each digit will be according to the following table:

| Time Word | 2 | 3 | : | 5 | 9 | : | 5 | 9 | . | 9 | 9 |
|---|---|---|---|---|---|---|---|---|---|---|---|
| Modulus | 3 | 10 | | 6 | 10 | | 6 | 10 | | 10 | 10 |

The second one of the hour digits is incremented or decremented in modulus 10, since the hour will reach 09 and 19 within each complete 24-hour cycle.

The arithmetic logic 40 is basically a state-of-the-art serial adder/subtractor with a flip-flop and steering logic to accomplish carry-over to or borrowing from an adjacent left digit where necessary.

Each new logic command from the command accumulator 58 communicates to the arithmetic logic 40 that a particular new time word is to be operated upon. This is translated by the arithmetic logic circuitry into a decision as to whether the time word is to be incremented or decremented and in what modulus each particular digit of the time word is to be operated upon.

The arithmetic logic 40 toggles the flip-flops of the data accumulator 30 during phases III and IV of the four-phase clock 35, i.e., when no shifting is taking place. This occurs, of course, only when the data accumulator contains a complete digit of the particular time word.

It should be noted here that in other embodiments, a plurality of digits could be operated on simultaneously by expanding the data accumulator storage from four-bit to 4*n*-bit (in BCD format). Likewise, the operation could be accomplished in a binary fashion with a one-bit (or "1*n*") accumulator. Other means of accomplishing this general result will doubtless be apparent to those skilled in the art to which this invention pertains.

In any event, actuation of the arithmetic logic 40 requires an instruction that the data accumulator 30 is "full". This condition occurs when the bit designator position B1, B2 of the binary ripple counter 52 contain "11". Recalling that this binary "3" is arbitrarily defined as four (signifying that bit four of the particular digit has just entered the data accumulator, this binary 11 is translated by the decoder 59 into a "high" input to the arithmetic logic.

The arithmetic logic 40 requires one final instruction — a chronometer input — to decide when each of the time words must next be unitarily incremented or decremented. In the case of a digital counter/timer which records values down to hundredths of a second, this would, of course, occur every hundredth of a second. In other words, during only a small percentage of the cycles of the binary shift register 10, will the arithmetic logic 40 actually alter any of the time word values.

This chronometer input can be provided by the four-phase clock 35, utilized in timing so many functions of the present device. In such a case, an ordinary frequency divider would be used to step down the frequency from the range of tens or hundreds of kHz needed for the shifting operation to the 100 Hz or so required for the value changing decision. In most applications, this would involve an integral step-down factor of 100 to 1000 or more.

However, it has been found most convenient to employ a clock 66 comprising an ordinary 100 Hz oscillator.

In operation, each time the 100 Hz clock 66 pulses the arithmetic logic 40, the logic circuitry within the latter increments or decrements (whichever the case may be, depending on the particular time word), by a value of "1", the least significant digit in each of the time words contained within the binary shift register 10. Knowing the identity of the particular time word corresponding to the digit instantaneously within the data accumulator 30, the logic performs this function in whichever arithmetic modulus is appropriate to that digit, carrying over to or borrowing from the next more significant digit of the time word as appropriate. Logic means well within the capability of those skilled in this art, insure that each time word cycles properly, e.g., from 99:59:59.99 to 00:00:00.00, or visa versa, depending on the particular time word.

It should be noted at this juncture that in a given application, two or more of the time words might be the same sort of value (e.g. a 24-hour count) with perhaps two of them incrementing from different initial value, while perhaps two others are decrementing from still other initial values. Obviously, the particular nature of a given time word depends entirely upon the particular logic circuitry within the arithmetic logic 40 assigned to the relative bit positions which that particular time word occupies within the shift register 10.

Figure 3:
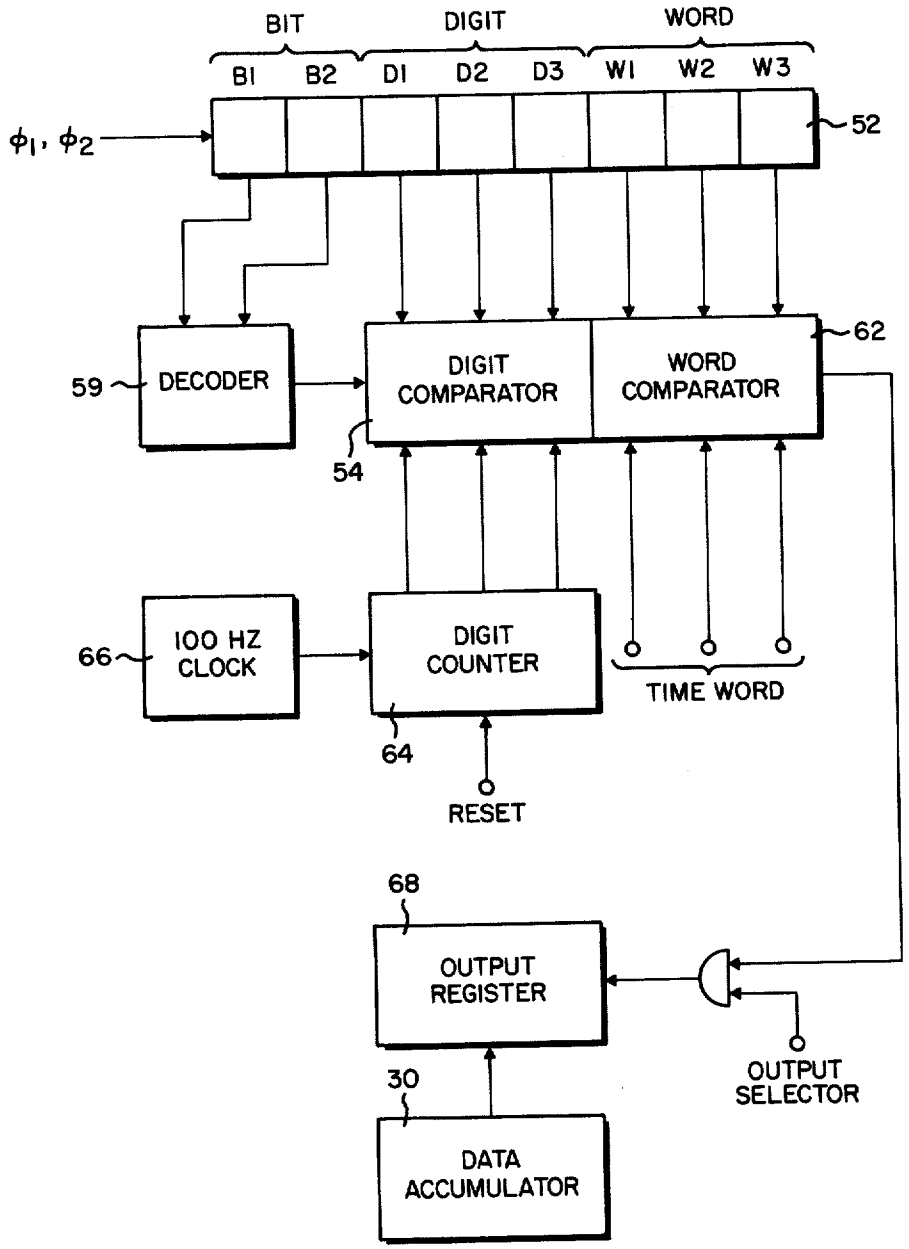
FIG. 3 is a block logic diagram of details of the interaction between the I/O address logic means, the output register and related circuitry as shown generally in FIG. 1.

Referring now to FIG. 3 of the drawing, the output function of the counter/timer will now be described.

In the preferred embodiment of the present invention, a time word is outputted from the binary shift register 10 in a digit-by-digit fashion from the data accumulator 30, beginning with the most significant digit of the word. In other embodiments, the entire word could be outputted in parallel (from the data accumulator 30 if it were extended to contain all digits of the word simultaneously), bit-by-bit or according to any other format desired. Outputting a single digit in BCD format is desirable, since most off-the-shelf display devices require a BCD input.

The word comparator 62 (which operates in conjunction with the digit comparator 54, in the preferred embodiment of this invention) is the basic time word locator. The identity of the particular time word which is to be outputted is inputted into the portion of the word comparator corresponding to the word designator bit positions W1, W2, W3, of the binary ripple counter 52. This may be done by providing a rotary switch by which the user may select the word desired for outputting, the switch activating conventional logic means to input the relative numerical position of the desired time word, expressed in binary, to those three bit positions. A digit counter 64 inputs, to the digit comparator, the relative position (within the time words) of the next digit to be outputted. This is compared with the digit designator bit positions D1, D2, D3 of the binary ripple counter 52.

Since D1, D2, D3 = "111" when the last digit of the word is entering the data accumulator 30, the digit counter inputs "111" to the digit comparator 54 the first time a digit from that word is to be outputted, "110" for the next digit, "101" for the succeeding digit, etc. I.e., the digit counter 64 is adapted to count backward, so that the digits of the word will be outputted in reverse order, so that blanks will be displayed on the optical display device (not shown) for all digits to the left of the left-most one having a non-zero value. This has been found to yield a more pleasing display than one in which useless zeros are represented.

An initial value of the digit count, for the particular time word (other than that corresponding to the number of digits in the word), can be inputted by the user, if this is desired, by means of a reset switch.

The digit comparator 54 and word comparator 62 are only activated at times when the accumulator is full. This is accomplished by employing the decoder 59 to translate "11" in bit designator positions B1, B2 into a "high " input to the comparators.

The digit counter 64 is operated by a clock, which, in the preferred embodiment of the present invention, is the same 100 Hz clock 66 employed in connection with the arithmetic logic 40 described above. Each pulse from the 100 Hz clock operates the digit counter, which changes the digit value within the digit comparator 54, causing the next digit (to the right) to be outputted from the data accumulator 30 to the output register 68, the next time it appears within the data accumulator intact (i.e. the next time D1, D2, D3 in the binary ripple counter 52 contains the binary number of the relative position of that digit within the particular word). This only occurs, of course, when the user has activated the output selector, a signal from which must be gated with the digit comparator 54 in order to activate the output register 68.

The optical display device (not shown) can consist of any of a number of commercially available devices, including a wide range of LED (light emitting diode) displays, the RCA NUMITRON and others. The display is operably connected to the output register 68 and the digit counter 64 so that a particular digit position of the display will be illuminated automatically when the output register is activated. Since most such commercial devices interpret binary "1111" as "blank", zeros are outputted from the output register as "1111" until the first non-zero digit of the particular time word is reached. This requires the use of simple, conventional decoder logic between the output register and the display.

Figure 4:
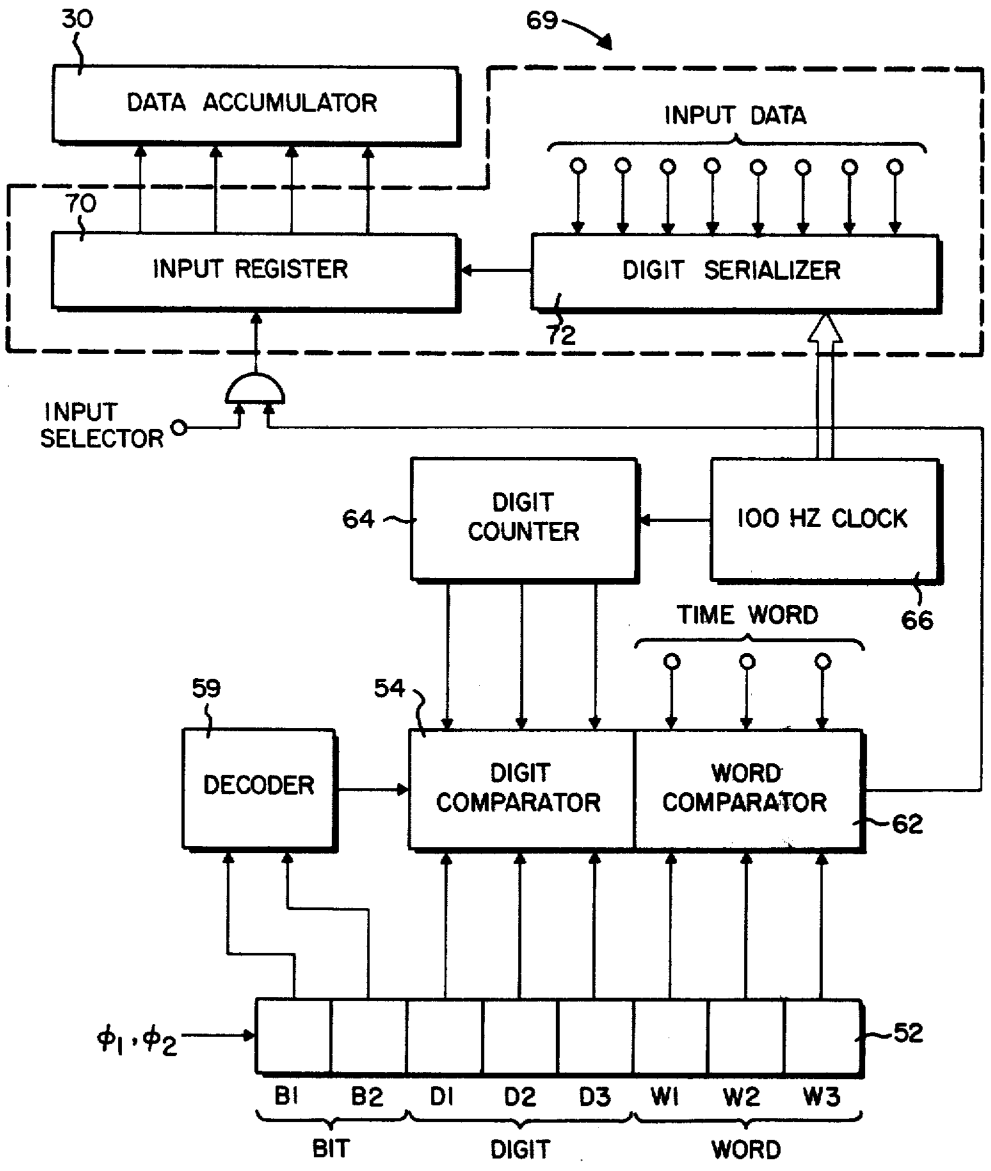
FIG. 4 is a block logic diagram of details of the interaction between the I/O address logic means, the data input logic means and related circuitry as shown generally in FIG. 1.

Referring to FIG. 4 of the drawing, the input function of the timer/counter will now be described in detail. The function of this portion of the device is to permit the user to set the initial values of any or all digits of any or all of the time words to be processed.

The input data can be placed in the digit serializer 72 by a number of means. For example, a plurality of rotary switches, one for each digit, may be operated by the user to input a desired value for each digit. Likewise, an external occurrence, for example a radio signal, a rocket engine ignition, etc., can input a preset intial value to the serializer. In any event, the digit values contained in the serializer are read into the input register 70 in the order of increasingly significant digits (i.e., right to left) starting (ordinarily) with the least significant digit. The input register, when operated, overrides the activity of the arithmetic logic 40 to input (in parallel) an entire BCD digit into the data accumulator 30.

This is accomplished similarly to the output function hereinabove described. The relative position of the particular time word is similarly inputted to the word comparator 62. The 100 Hz clock 66, digit counter 64, digit comparator 54, decoder 59 and binary ripple counter 52 operate similarly to their function in the output situation to provide a "high" signal when the data accumulator is ready to receive the particular new digit. This signal is gated with a signal from an input selector switch (operated by the user) to operate the input register 70, which simultaneously transfers the input register contents to the four bit positions of the data accumulator. The 100 Hz clock 66 also operates the digit serializer 72 so that a complete new digit will be in the input register each time it is activated.

The advantages of the counter/timer of the present invention over those heretofore utilized will now be fully apparent to those skilled in the pertinent art. The device can be fabricated from a relative small number of logic circuit components, due to the large degree of logic circuitry sharing. Likewise, the binary shift register 10, binary ripple counter 52, and command register 56, are rapidly circulating logic devices. Accordingly, the memory span of each of their individual flip-flops need not be long. Consequently, it is possible to fabricate this counter/timer using MOS logic components, which, while they have a rather short memory, are more economical and (more importantly) more reliable than standard TTL logic devices. Accordingly, the basic electronics of the preferred embodiment of this device can be placed on a single small MOS/LSI chip, the advantages of which, over the multi-function counter/timers currently in use, will be obvious to those familiar with them.

It is anticipated that for most applications it will be desirable to package the counter/timer of the present invention as a hard-wired apparatus. Here, the input/output selection would be accomplished by use of printed switches bearing designations such as "decimal countdown", "24-hour time-of-day", and the like. Likewise, the arithmetic logic would be hard-wired, so that the particular functions performed on the data accumulator 30 would correspond to the time word being operated upon.

However, it is not difficult to construct this device with interchangeable selector switches and interchangeable logic (as plug-in modules). With such an arrangement, the same eight word counter/timer could be used on one occasion to decrement eight different initial values in a decimal countdown, on a second occasion to increment eight initial values in a decimal elapsed time count and on other occasions to increment and/or decrement on a 24 hour or hundred hour cycle of hours, minutes and seconds, or on an ordinary decimal cycle. The range of such possibilities is enormous, and is limited only by the size of the storage means 10 and corresponding size of the subsidiary logic subcircuits such as the command register 56 and the binary ripple counter 52.

I claim:

1. A multi-function numerical processor comprising:

a. electronic storage means to store a plurality of independent numerical words, each of said words being logically represented within said storage means as an ordered series of digits, each of said digits being in a selected arithmetic modulus and logically represented as an ordered series of binary bits, the totality of said words being logically represented within said storage means as an ordered cyclic series of binary bits, said storage means comprising an accumulator adapted to store one of said digits and a memory adapted to store all portions of said word series not stored in said accumulator;

b. shifting means to serially cause each of the binary bits comprising each of the digits stored within said storage means to exit said memory and enter said accumulator;

c. logic means to act on any specific digit instantaneously stored within said accumulator to perform thereon an arithmetic operation in the arithmetic modulus of said specific digit, said operation comprising changing the modular magnitude of said specific digit unitarily in a selected algebraic sign if and only if the elapsed time since the last change in said digit exceeds a selected period, said electronic logic means comprising:

1. first electronic means to generate an electrical output signal indicative of the condition wherein an entire digit is instantaneously stored within said accumulator;
2. second electronic means to generate an electrical output signal representative of the identity of the specific digit;
3. third electronic means, responsive to the output from said second electronic means, to generate and electrical output signal representative of said algebraic sign;
4. chronometer means to generate an output signal indicating elapsed time; and
5. fourth electronic means, responsive to the output signals from said first electronic means, said third electronic means and said chronometer means, to perform said operation;

d. means to cause the binary bits comprising each digit stored within said accumulator to serially return, subsequent to the activity of said electronic logic means, to said memory into the assigned logical position of that particular digit within said word series; and e. output means operable on said storage means to extract the instantaneous values of all digits constituting any selected one of said numerical words.

2. The processor, as recited in claim 1, further inuding input means, operable on said storage means, to change the value of any selected digit stored therein, said input means adapted, when activated, to override the activity of said logic means.

3. The processor, as recited in claim 2, wherein said input means operates on the contents of said accumulator.

4. The processor, as recited in claim 1, wherein said storage means comprises a binary shift register.

5. The processor, as recited in claim 4, wherein the logical format of said shift register is BCD and each of said bit series comprises four bits.

6. The processor, as recited in claim 4, wherein said shifting means and said return means comprise a cyclic clock, each cycle of said clock comprising a fixed number of discrete phases, said memory and said accumulator operably connected with said clock in such manner that a selected pair of said phases causes a unitary logical position shift of all bit values throughout said shift register.

7. The processor, as recited in claim 1, wherein a response of said fourth electronic means comprises selection of said arithmetic modulus.

8. The processor, as recited in claim 1, wherein said second electronic means comprises a binary ripple counter.

9. The processor, as recited in claim 6, wherein said chronometer means, generates fixed-interval time pulses, and said fourth electronic means, in response to said pulses, determines if said period is exceeded.

10. The processor, as recited in claim 9, wherein the duration of said cycle is independent of said fixed interval.

11. The processor, as recited in claim 9, wherein said cycle duration is fixed and said time pulse interval exceeds said cycle duration by a factor of at least 100.

12. The processor, as recited in claim 11, wherein said factor is integral.

13. The processor, as recited in claim 6, wherein said chronometer means comprises said clock.

14. The processor, as recited in claim 4, wherein said output means comprises output register means, to extract, from said storage means, a single digit stored therein during a single operation of said output register means.

15. The processor, as recited in claim 14, wherein said output register means is operably connected with said accumulator, and said digit is a digit stored in said accumulator.

* * * * *